Dec. 10, 1929.  C. B. MILLS  1,739,251
SUPPORTING MEANS FOR GYROSCOPIC COMPASSES
Filed Sept. 13, 1923  3 Sheets-Sheet 1
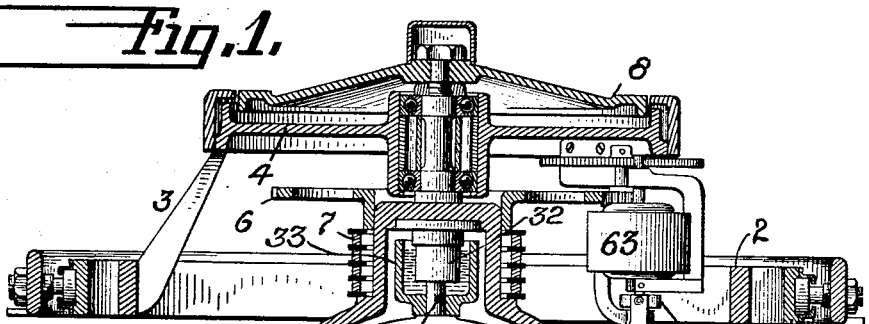
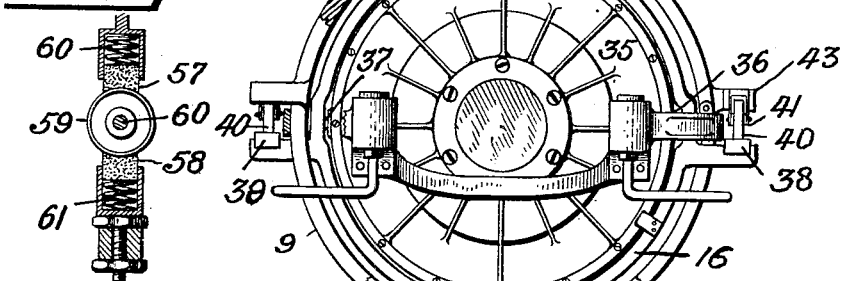
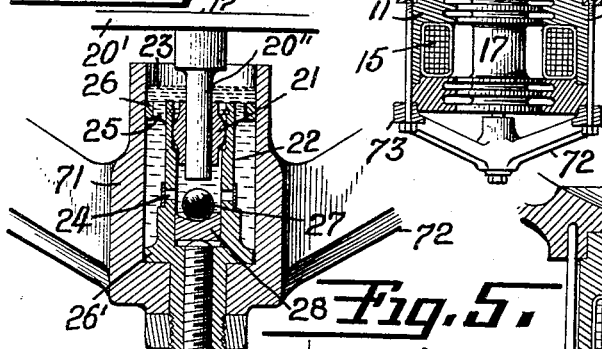
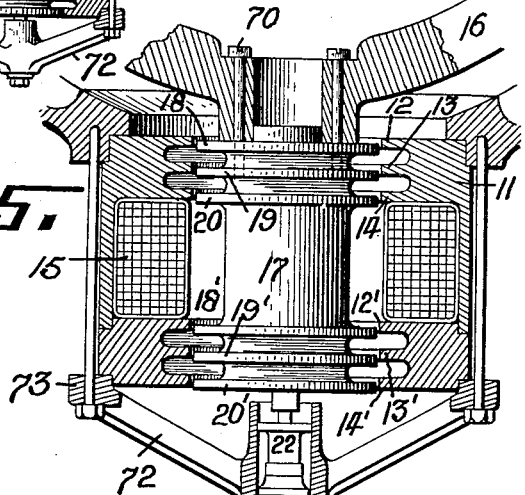
Inventor
Chester B. Mills.
By his Attorney
Herbert H. Thompson

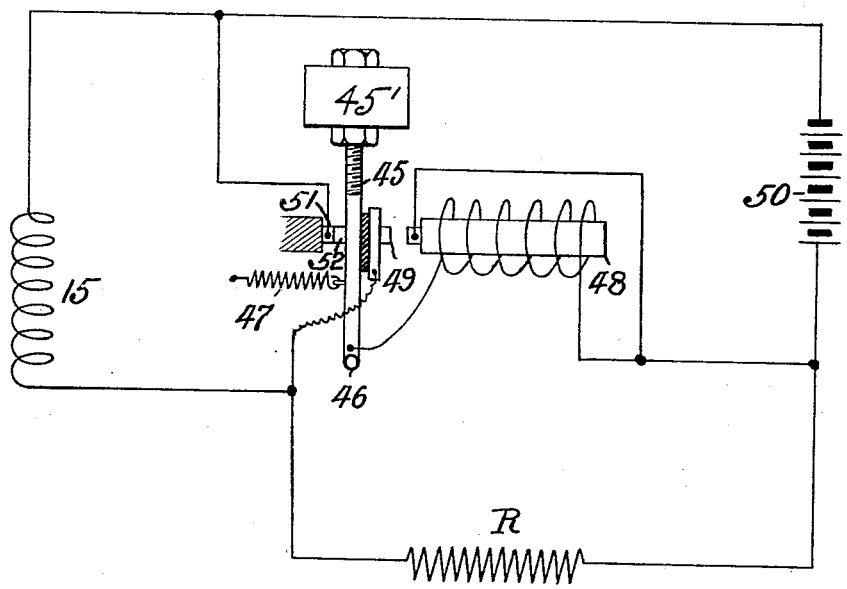
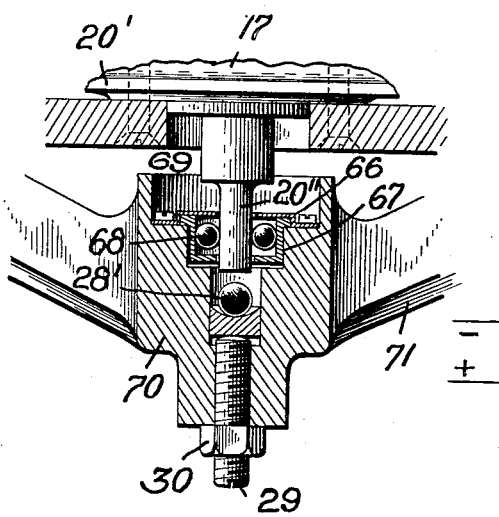
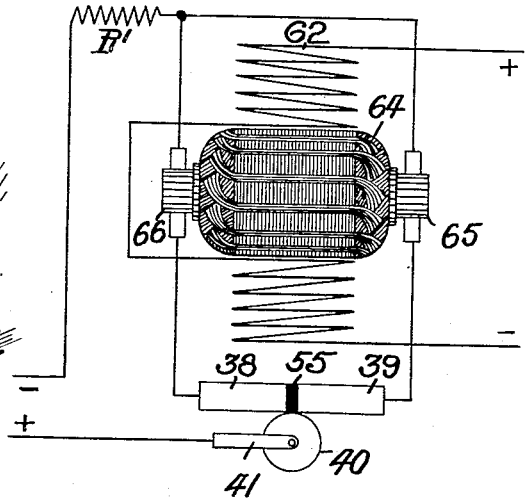
Inventor
Chester B. Mills.
By his Attorney
Herbert H. Thompson

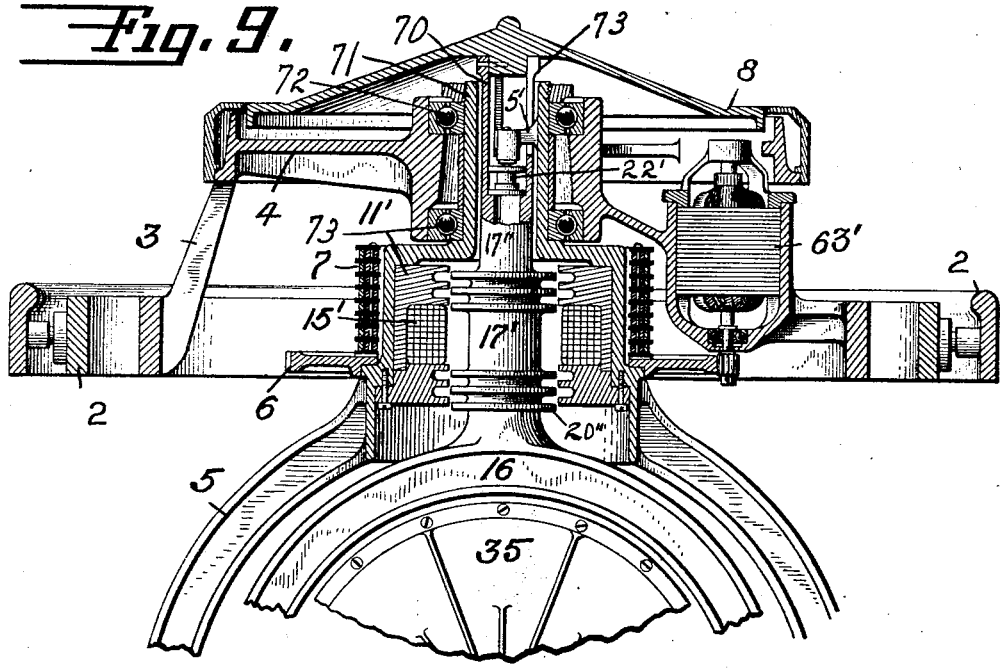
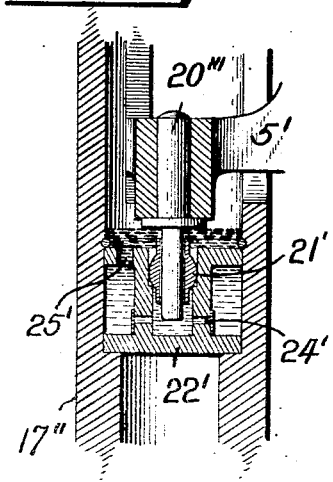
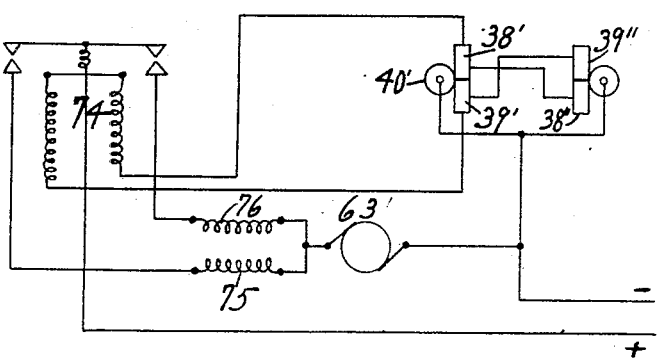

Patented Dec. 10, 1929

1,739,251

UNITED STATES PATENT OFFICE

CHESTER B. MILLS, OF BROOKLYN, NEW YORK, ASSIGNOR, BY MESNE ASSIGNMENTS, TO SPERRY GYROSCOPE COMPANY, INC., OF BROOKLYN, NEW YORK, A CORPORATION OF NEW YORK

SUPPORTING MEANS FOR GYROSCOPIC COMPASSES

Application filed September 13, 1923. Serial No. 662,590.

This invention relates to gyroscopic navigational apparatus and more particularly to the support of gyroscopic compasses about their vertical axes.

It has long been recognized that the gyroscopic compass should be supported for turning about a vertical axis without friction and many attempts have been made to achieve this result by various types of bearings, floats, magnetic supports and the like. The last named support offers certain fundamental advantages, in that in this type there are of course, no contacting surfaces, but heretofore, so far as I am aware, attempts to produce a successful magnetic support have not met with complete success.

The purpose of the present invention is to devise a non-contacting, electrically-actuated magnetic support, for instruments of this character, which will not only eliminate friction, but will be as dependable and as trustworthy as a liquid or mechanical support.

A further object of the invention is to produce a magnetic support of the character described, requiring a minimum amount of exciting current but which is powerful enough to support the comparatively heavy compass under the conditions of shocks and jars to which it is likely to be subjected in service.

A further object of the invention is to improve upon the construction of the vertical guide bearings for gyroscopic instruments.

A further object of the invention is to improve upon the construction of the motive means used to actuate the follow-up element or support for gyroscopic compasses.

Referring to the drawings in which what I now consider the preferred forms of my invention are shown;

Fig. 1 is a side elevation, partly in section, of a gyroscopic compass, showing my magnetic support mounted thereon.

Fig. 2 is an enlarged vertical section of my magnetic support.

Fig. 3 is an enlarged vertical section of the lower guide bearing.

Fig. 4 is a detail showing the friction brake used on the follow-up motor.

Fig. 5 is a side elevation of the control contacts used to actuate the motor.

Fig. 6 is a wiring diagram showing the means that may be employed to cause relative vibratory movement between the sensitive element and its support.

Fig. 7 is an enlarged vertical section of a modified form of lower guide bearing.

Fig. 8 is a wiring diagram of my preferred form of follow-up motor.

Fig. 9 is a vertical section partly in elevation of a modified form of compass, showing my magnetic support at the top.

Fig. 10 is an enlarged section of the top, vertical guide bearing.

Fig. 11 is a wiring diagram of a modified method of producing relative vibratory movement between the sensitive element and its support.

I have illustrated my invention as applied to a compass of the Sperry type, comprising supporting gimbal rings 1 and 2, the latter supporting by brackets 3, the frame 4. Within the frame is journaled the follow-up support 5, comprising the usual gear 6, slip rings 7, compass card 8 and phantom ring 9. On the follow-up support I prefer to mount one element 10 of the magnetic supporting means. In Fig. 1 I have illustrated the magnetic support at the bottom of the compass, although it will be obvious that it might be placed at the top, as shown in Fig. 9. Element 10 comprises preferably a ring 11 of magnetic material, having a substantially C or U shaped cross-section. On the inner periphery of the ring and at each end of the C I provide at least one or preferably several, inwardly projecting annular flanges 12, 13, 14, 12′, 13′, 14′. These flanges form annular magnetic teeth which project out horizontally and are spaced axially or vertically. I also preferably mount in the center of the ring the exciting coil 15, which is shown as held between the two ends of the C. On the vertical ring 16 of the compass, I secure, as by set screws 70 the central magnetic core 17 which extends through or into the ring 16. Said core is provided with preferably several annular flanges 18, 19, 20, 18′, 19′, 20′ adjacent each end thereof, to furnish annular magnetic teeth cooperating with the inwardly facing teeth 12, 13, 14, 12′, 13′, 14′.

By providing an air gap both at the top and bottom of the magnetic support, the bearing is able to support a very much greater weight than a single gap, such as heretofore proposed in the art would be able to carry. Also, by dividing the path of the magnetic flux crossing between the core and shell at each end, into a plurality of vertically spaced planes, the supporting power of the bearing is further increased by concentrating the flux more effectively and at the same time magnetic saturation of the iron avoided. Furthermore, it should be noted that if no load were on the bearing the magnetic lines of force would extend substantially horizontally across the gaps. When a load is placed on the bearing however, the lines of force will be bent downwardly, and thereby somewhat lengthened, until the magnetic pull balances the supported weight. An increase in the exciting current therefore, will not bring parts of the bearing into contact as would be the case if the supporting magnet were above the supported magnet, as hereto proposed in the art, but such increase will merely raise the core a slight amount. A corresponding decrease, on the other hand, merely results in lowering the core a slight amount, but does not "let go" of the load, within fairly wide limits. This action I prefer to make use of as hereinafter pointed out.

For guiding the sensitive element, or more specifically, the vertical ring 16 forming a part thereof, in the follow-up support, I have shown a downwardly extending stem 20" secured to core 17 (Fig. 3). Said stem is shown as guided in a self aligning bearing block 21 supported in the sleeve 22 having upper and lower guide flanges 26 and 26'. Sleeve 22 in turn fits in the hollow hub 71 which extends above the top of the sleeve and is supported by spokes 72 from clamp ring 73. Preferably, the entire bearing is maintained submerged in oil which is placed in the hollow hub as indicated by the oil level 23. To permit oil to flow freely within the sleeve, holes 24 may be provided near the bottom thereof and also holes 25, extending through the guide flange 26 at the top of the sleeve.

For supporting the compass when not in use, or in case of failure of the supply current, I have shown a hardened steel ball 27 adjustably supported by a block 28 below the stem 20". As shown, said block 28 may be adjusted by set screw 29 which may be provided with lock nut 30. The ball may be adjusted within a few thousandths of an inch of the bottom of the spindle, the spacing in both this figure and in Fig. 7 being shown as exaggerated for the sake of clearness. The vertical ring is shown guided at the top by a stem 31 extending upwardly therefrom which turns in bearing sleeve 32 extending downwardly from the follow-up support. This bearing also is preferably immersed in oil, the vertical ring being shown as provided with a cup 33 surrounding the bearing.

The vertical ring is shown as supporting the usual gyro rotor casing 35 on a horizontal axis 36, 37. For exciting the follow-up motor, I have shown reversing contacts 38, 39 (Fig. 5) mounted on either or both sides of the vertical ring and trolley 40 pivoted on the follow-up phantom ring 5. On account of the vertical vibratory movement which I prefer to impart between the follow-up and sensitive elements, as hereinafter explained, I prefer to place the trolley in a vertical position, as shown, with the contacts directly thereunder. The trolley is shown as journaled on arms 41 pivoted at 42 to bracket 43 on the follow-up phantom ring, so that the trolley will remain on the contacts independent of the slight vertical vibration of the sensitive or follow-up elements, if employed.

In order to eliminate static friction of the vertical guide bearings, I prefer to impart thereto continuous relative movement. This may be done by continuously oscillating the follow-up element 5 in a horizontal plane, which means is described more particularly in connection with Figs. 9 and 11. I may however, supply this relative movement by imparting to the sensitive element a vertical vibration, or tremor. This may readily be accomplished by means of my improved magnetic support, since as explained above, any material variation in the amount of current passing through the exciting coil 15, will result in a slight movement up or down of the core 17 and consequently of the entire sensitive element. For rapidly and periodically varying the strength of the coil, I may employ a self operated magnetic cut-out, or interrupting coil which is illustrated diagrammatically in Fig. 6. In this figure an armature 45 is represented as pivoted at 46 and is biased in one direction by tension spring 47. Solenoid 48 when excited pulls the armature clockwise against the spring. The contact 49 on contacting with stationary contact 51' operates to short circuit resistance R which is normally in series between the exciting coil 15 and the electro-motive source 50, while at the same time the current through the interrupting coil 48 is broken, whereupon, the armature is returned by the spring engaging back contacts 51, 52 which again excites the interrupting solenoid and cuts in resistance R, to weaken coil 15. The result is that continuous rapid vertical vibration of the sensitive element is maintained. The period may be varied by adjusting weight 45' on threaded stem 45.

When this is done, it is of course unnecessary to oscillate the follow-up element as has heretofore been common practice. I prefer for this reason to employ an improved form of follow-up motor. According to my invention, preferably the space or insulation 55 between the contacts 38 and 39 is made broad enough so that when the trolley is resting in the middle thereof, it does not contact with either live contact. The motor is then unexcited and stationary. When the contact rolls to one side, the motor is excited and rotates the follow-up support in the proper direction to again break the contact.

In order that the momentum of the armature may not cause the motor to overthrow the follow-up system, I may provide a friction brake on the armature. One form of brake is shown in Fig. 4 comprising friction blocks 57 and 58 normally pressed against friction wheel 59 on shaft 60 of the armature by means of adjustable springs 60 and 61.

In order that I may employ the same voltage on the follow-up motor as employed on the ship's supply or gyro rotor, and at the same time avoid sparking at the reversing contacts, I prefer to employ a special winding on the motor such as illustrated in Fig. 8. According to this figure, the field winding 62 of the motor 63 is separately and continuously excited in the same direction, say from the ship's supply. The armature on the other hand is provided with two opposed windings 64, each of which has a commutator 65 or 66 at either end of the armature. One cummutator 65 is in circuit with one contact 38 and the other commutator 66 is in circuit with contact 39 as shown, so that the motor will be driven in one direction when the trolley 40 is on the contact 38 and in the opposite direction when the trolley is on contact 39 and remain stationary when the trolley is on the dead section 55. A resistance R' may be placed in the armature circuit, if desired. By this method the self inductance of the circuit broken at contacts 38, 39, 40 is greatly reduced.

Fig. 7 shows a modified form of guide bearing employing ball bearings instead of a plain bearing. In this figure a cage 66, 67 for the balls 68 may be mounted in a recess 69 in the central boss 70 of the bracket 71, so as to guide the vertical ring at its lower end. As before, an auxiliary ball thrust bearing 28' is provided to support the bearing in case the magnetic support is inoperative.

Figs. 9, 10 and 11 show a modified form of my invention in which the electro-magnetic supporting means is placed at the top of the compass and also in which the relative oscillatory movements between the sensitive and follow-up elements is obtained by imparting to the follow-up element a small amplitude oscillation. Of course, if desired, the vertical vibration of the sensitive element may also be retained. The parts of the compass in Fig. 9 are correspondingly numbered to similar parts in Fig. 1 and will be at once recognized. In this instance however, the compass card 8 is shown as supported on a hollow stem 17″ rising from the core 17′ secured to the vertical ring 16. The card therefore is supported directly on the sensitive element instead of by the follow-up element as illustrated in Fig. 1. By this means the oscillations of the follow-up element do not appear on the card. The follow-up element is shown as provided with an upwardly extending hollow stem 71 journaled in a bracket 4 by anti-friction bearings 72 and 73. The upper guide bearing in this instance is provided by means of a bracket 5′ extending inwardly from the sleeve 71 through a slot 73 in the inner sleeve 17″. Said bracket 5′ supports a stem 20‴, which is journaled for turning in a self aligning bearing block 21′. Said block in turn is supported by the bracket 22′ fitted within and supported by the sleeve 17″. As before, the bearing may be immersed in oil as shown, oil holes 24′ and 25′ being provided for this purpose. The outer member 11′ of the magnetic support is again shown as supported by the follow-up element, while the core 17′ is secured to the vertical ring 16 on the sensitive element.

In this instance the follow-up motor 63′ is shown as of the ordinary type with a single commutator and double field windings 75 and 76 (see Fig. 11). The reversing contacts 38′, 39′ which may be duplicated as shown at 38″, 39″ are in this instance separated by a very small gap 55′, so that the trolley 40′ always contacts with at least one live contact. Also there may be provided a reversing relay 74 in the circuit between the trolley contacts and the opposite fields 75 and 76 on the motor. By this means, even though the sensitive element is stationary, the follow-up element is maintained in a state of constant oscillation through a small angle, thus maintaining freedom of the bearings. As heretofore intimated the vertical oscillation of the sensitive element as shown in connection with Figs. 1 to 8, may or may not be retained in this form of compass.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having herein described my invention what I claim and desire to secure by Letters Patent is:

1. In a gyroscopic compass, a follow-up support, a sensitive element, a magnetic support between said support and element having one portion thereof mounted on said support and the cooperating portion on said element, oil immersed vertical guide bearings between said elements, the lower of said bearings also constituting an auxiliary thrust bearing for supporting the sensitive element when the magnetic support is not functioning.

2. In a gyroscopic compass, having a sensitive element and a follow-up support therefor, a magnetic support acting between said elements and located adjacent the top of the compass, a stem secured to said sensitive element rising to the top of the compass, a compass card secured thereto, a guide bearing within said stem, and a projection from the follow-up support extending within said stem forming one part of said bearing.

3. In a gyroscopic compass, having a sensitive element and a supporting element, of a magnetic support acting between said elements comprising a plurality of spaced annular magnetic portions on one of said elements, cooperating spaced annular magnetic portions on the other of said elements, an auxiliary normally inoperative thrust bearing for supporting said sensitive element when said magnetic support is not functioning, comprising a ball and a vertically adjustable support for said ball.

In testimony whereof I have affixed my signature.

CHESTER B. MILLS.